US010060553B2

(12) United States Patent
Hotz et al.

(10) Patent No.: US 10,060,553 B2
(45) Date of Patent: Aug. 28, 2018

(54) VALVE

(71) Applicant: FESTO AG & Co. KG, Esslingen (DE)

(72) Inventors: Jasmin Hotz, Lichtenwald (DE); Markus Dreher, Stuttgart (DE); Michael Kanthack, Wimsheim (DE)

(73) Assignee: FESTO AG & CO. KG, Esslingen (DE)

( * ) Notice: Subject to any disclaimer, the term of this patent is extended or adjusted under 35 U.S.C. 154(b) by 0 days.

(21) Appl. No.: 15/126,122

(22) PCT Filed: Mar. 26, 2015

(86) PCT No.: PCT/EP2015/000650
§ 371 (c)(1),
(2) Date: Sep. 14, 2016

(87) PCT Pub. No.: WO2015/149919
PCT Pub. Date: Oct. 8, 2015

(65) Prior Publication Data
US 2017/0097107 A1  Apr. 6, 2017

(30) Foreign Application Priority Data

Mar. 31, 2014  (DE) .................. 10 2014 004 667

(51) Int. Cl.
*F16K 41/02* (2006.01)
*F16K 1/10* (2006.01)
*F16K 27/10* (2006.01)

(52) U.S. Cl.
CPC ............... *F16K 41/02* (2013.01); *F16K 1/10* (2013.01); *F16K 27/102* (2013.01)

(58) Field of Classification Search
CPC .......................................... F16K 41/00–41/086
(Continued)

(56) References Cited

U.S. PATENT DOCUMENTS 877,706 A    1/1908  Duffy
3,011,808 A  * 12/1961 Tucker .................. F16J 15/183
                                                    277/512
(Continued)

FOREIGN PATENT DOCUMENTS

DE    1267923    3/1968
DE    2252532    5/1974
(Continued)

OTHER PUBLICATIONS

Machine Translation of DE1267923.*
Machine Translation of EP2110585.*

*Primary Examiner* — Michael R Reid
(74) *Attorney, Agent, or Firm* — Hoffmann & Baron, LLP

(57) ABSTRACT

A valve including a valve housing through which a process medium can flow and in which a valve seat is located, which surrounds a through-flow opening and to which a valve member mounted on a spindle is assigned in such a way that the valve member can be moved by means of an actuating stroke of the spindle between a blocking position in which the valve member bears against the valve seat in a process medium-tight manner and an open position in which the valve member is raised off the valve seat, and wherein an interface for coupling a drive unit generating the actuating stroke of the spindle is provided on the valve housing, and wherein a sealing device through which the spindle passes is accommodated in the valve housing, the sealing device is accommodated in a seal cartridge which is separate from the valve housing and configured as an operational pre-assembly.

13 Claims, 4 Drawing Sheets

(58) Field of Classification Search
USPC .................................. 251/214, 319, 330
See application file for complete search history.

(56) References Cited

U.S. PATENT DOCUMENTS

| | | | |
|---|---|---|---|
| 3,521,891 A | | 7/1970 | Tripoli |
| 3,726,187 A | * | 4/1973 | Lewis ................ F15B 15/1447 91/442 |
| 5,263,682 A | * | 11/1993 | Covert ................ F16K 41/046 137/312 |

FOREIGN PATENT DOCUMENTS

| | | |
|---|---|---|
| DE | 123115 | 11/1976 |
| DE | 9414832 | 12/1994 |
| EP | 2110585 | 10/2009 |
| WO | WO2008024898 | 2/2008 |

* cited by examiner

VALVE

This application claims priority based on an International Application filed under the Patent Cooperation Treaty, PCT/EP2015/000650, filed Mar. 26, 2015, which claims priority to DE102014004667.2, filed Mar. 31, 2014.

BACKGROUND OF THE INVENTION

The invention relates to a valve, in particular a process valve, comprising a valve housing through which a process medium can flow and in which a valve seat is located, which surrounds a through-flow opening and to which a valve member mounted on a spindle is assigned in such a way that the valve member can be moved by means of an actuating stroke of the spindle between a blocking position in which the valve member bears against the valve seat in a process medium-tight manner and an open position in which the valve member is raised off the valve seat, and wherein an interface for coupling a drive unit generating the actuating stroke of the spindle is provided on the valve housing, and wherein a sealing device through which the spindle passes and which comprises a seal assembly including sealing means bearing against the spindle while forming a seal is accommodated in the valve housing.

A valve of this type is, for example, known from EP 2 110 585 A1. The so-called angle seat valve disclosed in this publication comprises a valve housing through which a process medium can flow. A valve seat bounding a through-flow opening is formed in the valve housing. The valve seat is assigned a sealing element which is supported by a spindle driven to perform a linear movement via a pneumatic actuator, so that the through-flow opening can be optionally opened or closed by the sealing element. A typical feature of such angle seat valves is that the valve seat area spanned by the valve seat is oriented at an angle to the flow direction of the process medium. As a result, the spindle is likewise oriented at an angle to the flow direction of the process medium and the actuating stroke is inclined accordingly. In the prior art referred to above, an interface for coupling the pneumatic drive unit is formed on the valve housing. For this purpose, a pipe is screwed into a connector projecting at an angle from the rest of the valve housing. The pipe is a part of the pneumatic actuator, because the cylinder of the pneumatic actuator is secured to the pipe end opposite the pipe end which is screwed into the valve housing. For this purpose, the pipe has a mounting section which has a larger diameter than the rest of the pipe and which also forms the end cover section of the cylinder housing, in which a piston is movably guided by means of the application of compressed air, the piston dividing the interior of the cylinder into two chambers. In addition, the pipe has a further purpose, i.e. the accommodation of a sealing device with a seal assembly in the form of a V-sleeve packing preloaded by a spring likewise located in the pipe.

The stroking movement of the spindle results in the wear of the V-sleeves of the V-sleeve packing, forcing their replacement. To replace the seals, however, the entire pneumatic actuator has to be removed from the valve housing. Furthermore, the pipe has to be separated from the rest of the pneumatic actuator to make the sealing device accessible. This is a very complex and expensive operation.

Another angle seat valve is known from DE 22 52 532. The angle seat valve disclosed there comprises a valve housing with an interface for coupling a pneumatic actuator. In this case, a support bushing is provided through which the valve spindle passes and which accommodates a V-sleeve packing. The support bushing is inserted into a connection of the valve housing, an axial stop in the form of an annular shoulder on the connection being provided. The support bushing in turn has the interface for coupling the pneumatic actuator. This is assembled with the support bushing before the latter is inserted into the connection; in this process, a washer separate from the support bushing comes into contact with the top side of the support bushing. After the support bushing together with the pneumatic actuator has been inserted into the connection, it is secured against axial movement out of the connection by means of a sleeve nut tightened onto a male thread formed on the connection.

In order to replace the seals, the sleeve nut first has to be released, and the support bushing has to be removed from the valve housing together with the pneumatic actuator. This is followed by the complicated removal of the support bushing from the spindle.

SUMMARY OF THE INVENTION

The invention is therefore based on the problem of creating a valve of the type referred to above, which can be assembled and serviced in a simple way; it is in particular the intention that wear-prone seals should be replaced in a simple way.

This problem is solved by a valve with the features of the independent claim 1. Further developments of the invention are specified in the dependent claims.

The valve according to the invention is characterised in that the sealing device is accommodated in a seal cartridge which is separate from the valve housing and configured as an operational pre-assembly and which comprises a cartridge housing which can be or is secured to the valve housing and in which the seal assembly and the spring means are accommodated in such a way that the seal assembly is resiliently preloaded against the cartridge housing by the spring means.

The valve housing, the seal cartridge and the coupled drive unit are therefore separate components which can be assembled or dismantled simply and quickly. This facilitates a fast and therefore cost-effective replacement of wear-prone seals.

As the seal cartridge is a pre-assembly which includes all components of the sealing device, the seal cartridges only have to be replaced without being dismantled. A seal cartridge can therefore be replaced as a whole by another.

In a further development of the invention, the seal cartridge has a mounting interface for its self-retaining mounting on the valve housing. There is therefore no need for any further mounting aids for mounting the seal cartridge on the valve housing or for removing it if required.

In a particularly preferred way, the mounting interface is formed on the cartridge housing.

In a particularly preferred embodiment, the mounting interface has a thread which allows the seal cartridge to be screwed into the valve housing, which is a particularly fast and simple operation. In principle, however, other ways of securing the seal cartridge to the valve housing are conceivable, for example latching, snap-on connections or clamping.

In a further development of the invention, the cartridge housing has a locating section for the seal assembly and the spring means, the locating section comprising an encasing region encasing the seal assembly and the spring means and a base region provided with a central through-hole. On its inside, the base region may have a cone surface complementing a mating cone surface formed on the outside of the seal assembly, wherein the diameter of the through-hole is greater than the outer diameter of an end region of the seal assembly to such an extent that the seal assembly, owing to the mutually complementary cone surfaces and the preload generated by the spring means, projects through the through-hole, terminating outside the encasing region with its free end. An end-side sealing element of the seal assembly expediently forms a wiper which wipes off any dirt or process medium accumulated on the moving spindle.

In a further development of the invention, the cartridge housing has a cover section, which is connected to the locating section and has a through-opening for the spindle, and on which the mounting interface is formed.

The cover section is expediently cylindrical. In this case, a male thread is preferably formed on the lateral surface of the cylindrical cover section for tightening into the valve housing.

In a further development of the invention, the cover section has a support surface which faces the locating section and is oriented radially, and on which the spring means are supported. The cover section of the cartridge housing is multifunctional, because the mounting interface is formed on it (interfacing function) and the spring means are supported on it (support function).

In a particularly preferred way, the cover section and the locating section are permanently joined to each other. The inseparable unit comprising the cover section and the locating section can be produced particularly cost-effectively, because in this case there is no need for joining means to join the cover section to the locating section. Furthermore, the inseparable unit prevents the dismantling of the seal cartridge, so that it is impossible to replace the seal assembly located therein and to reuse the same seal cartridge. This would be very time-consuming. The inseparable unit comprising the cover section and the locating section therefore demands that a seal cartridge has to be replaced by a new one, and the seal cartridge to be replaced can be disposed of or recycled.

In a further development of the invention, the sealing device comprises a sealing unit which is formed separately from the seal assembly and bears against the spindle while forming a seal, and which is positioned at an axial distance from the seal assembly. Such an arrangement of two sealing units or seal assemblies respectively located at different positions along the travel of the spindle creates a double sealing action, i.e. a valve-side seal towards the process medium and a drive-side seal towards the control medium. This is particularly effective, because it prevents the egress of process medium and the ingress of contamination into the process medium.

In a particularly preferred way, the sealing unit comprises at least one annular sealing element with at least one sealing lip bearing against the spindle to form a seal. In a particularly preferred way, at least two axially spaced sealing lips are provided. The at least one sealing lip of the sealing unit expediently acts as a wiper as well. The combination of seal assembly and wiper and of sealing unit and wiper forms, as a twin wiper, a particularly effective facility for removing dirt from the spindle.

In a further development of the invention, the sealing unit is located in the cover section of the cartridge housing. If the sealing element is made of an elastomer material, this can be secured in a self-centering manner in a receptacle provided for this purpose on the cover section.

In a further development of the invention, the valve housing is constructed in several parts, with a fluid ducting part including the valve seat and a separately formed hollow-cylindrical interface part with the interface for coupling the drive unit. As a whole, this results in a modular construction of the valve housing, because the interface part can, if required, be replaced by another interface part suitable and intended for coupling a different drive unit.

The interface part is expediently releasably mounted on the fluid ducting part. At smaller nominal widths, the interface part and the fluid ducting part can be designed as a single part, which may be made of a casting material, for example.

In a particularly preferred way, the releasable connection between the interface part and the fluid ducting part is implemented by way of a screw connection which in particular comprises a male thread formed on the interface part and a female thread formed on a coupling section of the fluid ducting part.

In a particularly preferred way, the seal cartridge is accommodated in the interface part and releasably secured there.

BRIEF DESCRIPTION OF THE DRAWINGS

A preferred embodiment of the invention is shown in the drawing and explained in greater detail below. In the drawing.

DETAILED DESCRIPTION OF THE PREFERRED EMBODIMENTS

FIGS. 1 to 5 show a preferred embodiment of the valve 11 according to the invention. The valve 11 is suitable for use as a process valve in the process industry.

Figure 1:
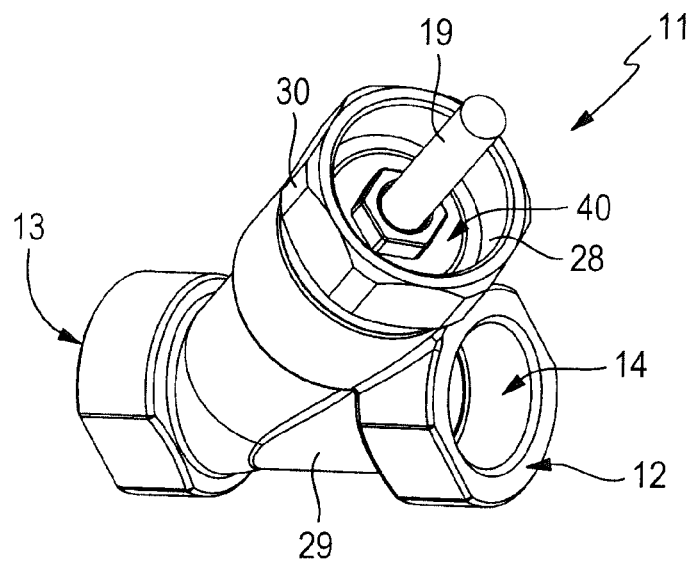
FIG. 1 is a perspective view of a preferred embodiment of the valve according to the invention.
Figure 2:
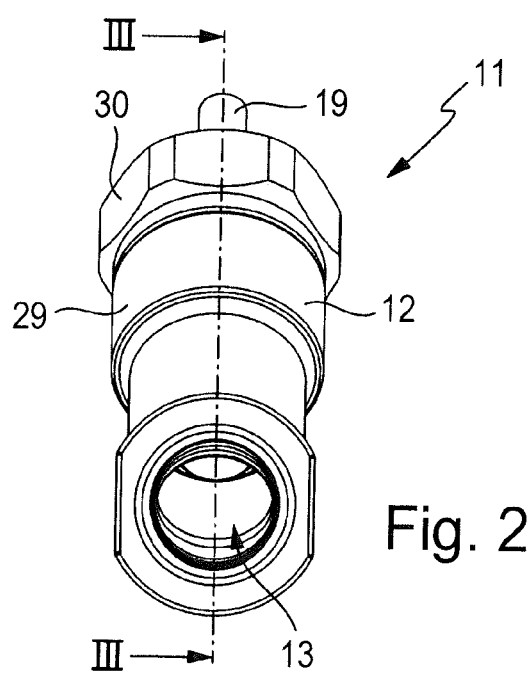
FIG. 2 is a front view of the valve from FIG. 1.
Figure 3:
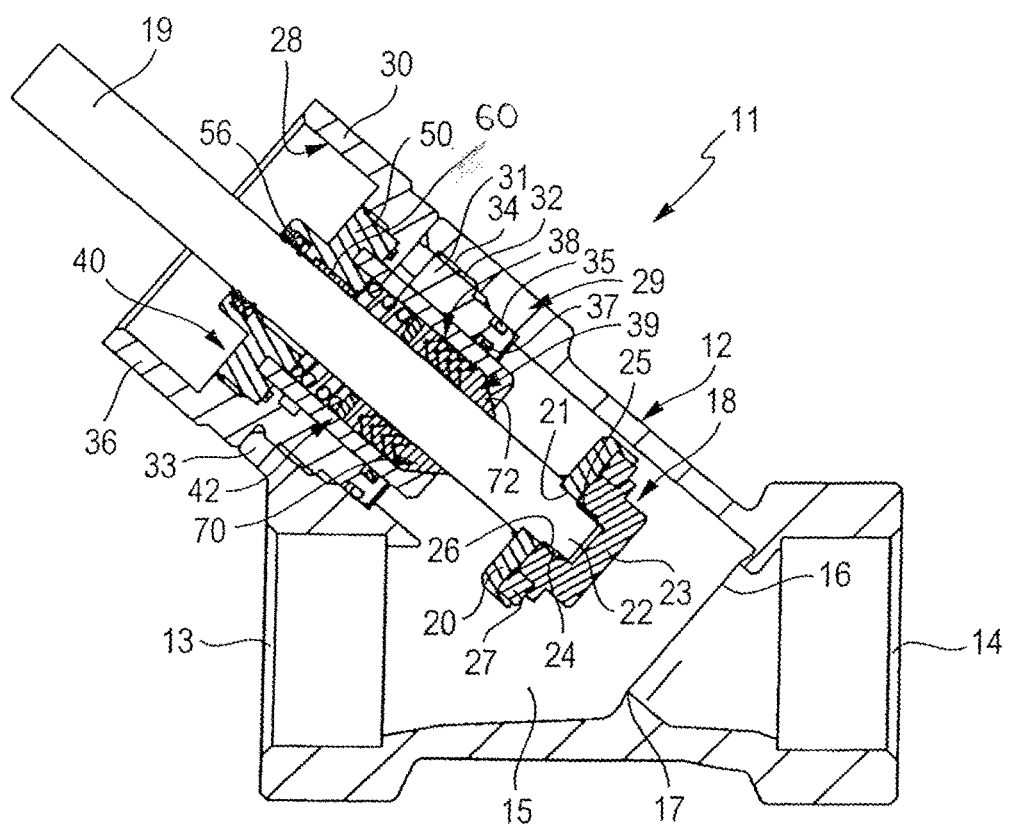
FIG. 3 is a longitudinal section through the valve along line from FIG. 2.

As FIGS. 1 and 3 show in particular, the valve 11 has a valve housing 12, in which a through-flow passage 15 extends between an inlet 13 and an outlet 14.

If used in the food industry, the valve housing is preferably made of stainless steel. If aggressive substances such as acids are used as process medium, the valve housing is expediently made of a plastic material with a higher chemical resistance against such substances.

In the through-flow passage 15, between the inlet 13 and the outlet 14, there is a through-flow orifice 16 surrounded by an annular valve seat 17. The valve seat 17 is expediently designed as an annulus. Theoretically, however, an oval form of the valve seat is conceivable as well.

A valve member 18 located on a spindle 19 is assigned to the valve seat 17.

Purely by way of example, the valve member 18 is shown as a multi-part unit, in this case comprising a disc 20 with a through-hole 21, through which an end section 22 of the spindle can be inserted. The disc is welded to the spindle, for example. The valve member 18 further includes a counterpart 23 with a blind hole-type locating opening 24, which is provided with a female thread 25. Complementary thereto, the end section 22 of the spindle 19 has a male thread 26, by means of which the counterpart 23 can be tightened onto the end section 22 of the spindle 19. Between the counterpart 23 and the disc 20, an annular seal ring 27 is clamped; this is expediently made of a plastic material, for example PTFE.

By means of an actuating stroke of the spindle 19, the valve member 18 is movable between a blocking position, in which the valve member 18 bears against the valve seat with its seal ring 27 to form a seal, and an open position (FIG. 3), in which the valve member 18 is lifted off the valve seat 17. The actuating stroke of the spindle 19 is generated by a drive unit (not shown) which is coupled by way of an interface 28 formed on the valve housing 12. The drive unit may be a fluidic, in particular pneumatic, drive unit. In the latter case, the actuating stroke of the spindle 19 can, for example, be generated by an operating cylinder to which fluid pressure is applied. Alternatively, the drive unit could be designed as an electric drive unit.

As FIG. 3 in particular shows, the valve housing 12 is constructed in several parts. The valve housing 12 has a fluid ducting part 29, in which the through-flow passage 15 and the valve seat 17 are formed. The valve housing 12 further has an interface part 30, where the interface 28 for coupling the drive unit is formed. The interface part 30 is designed as a hollow cylinder and has several functional sections. One of these is a cylindrical locating section 31 with a male thread 32 on its lateral surface. This male thread 32 corresponds to a female thread 34 formed on a locating stub 33 of the fluid ducting part 29, whereby the interface part 30 can be tightened onto the fluid ducting part 29. This makes the removal of the interface part 30 from the fluid ducting part 29 easy, for example for replacement by another interface part 30 with another interface 28. At smaller nominal widths, the interface part 30 and the fluid ducting part 29 can be designed as a single part, which may be made of a casting material, for example.

On the outer lateral surface of the locating section 31, there is further provided a continuous annular groove into which a seal ring 35 is inserted and located there. This outer seal ring 35 provides the seal between the interface part 30 and the fluid ducting part 29.

On the inner lateral surface of the locating section 31, there is provided a further annular groove into which a seal ring 37 is inserted and located there.

A further functional section of the interface part 30 is an interface section 36, on which the interface 28 is formed. The interface section is integrally joined to the locating section 31 but has a larger diameter than the latter, so that the annular shoulder formed at the transition between the interface section 36 and the locating section 31 forms a stop which hits the locating stub 33 of the fluid ducting part 29, thereby predetermining the length of thread engagement of the interface part 30.

The valve 11 further comprises a sealing device 38, through which the spindle 19 passes and which comprises a seal assembly 39 including sealing means preloaded by spring means and bearing against the spindle 19 while forming a seal.

The sealing device 38 is accommodated in a seal cartridge 40, which is separate from the valve housing 12 and configured as an operational pre-assembly.

Figure 5:
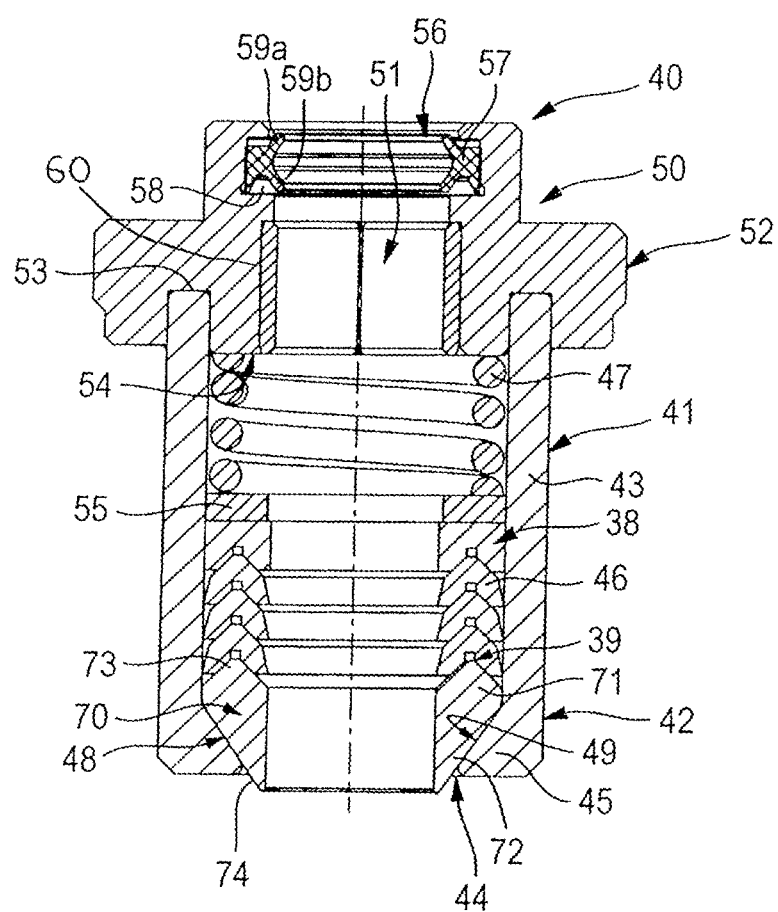
FIG. 5 is an enlargement of detail X from FIG. 4

As FIG. 5 in particular shows, the seal cartridge 40 comprises a cartridge housing 41, which can be or is secured to the valve housing 12 and in which the seal assembly 39 and the spring means are accommodated.

The cartridge housing 41 has several functional sections. A locating section 42 is provided for the accommodation of the seal assembly 39 and the spring means. The locating section 42 has the shape of a beaker and comprises an encasing region 43 encasing the seal assembly 39 and the spring means and a base region 45 provided with a central through-hole 44.

By way of example, the seal assembly is shown in the form of a V-sleeve packing, with a plurality of annular V-sleeves 46 stacked on top of one another in the axial direction being provided as individual sealing elements. As FIGS. 4 and 5 in particular show, the V-sleeves 46 are approximately V-shaped in cross-section and stacked in the manner of riders, so that the V-sleeves 46 widen radially under pressure, thereby providing a fluid-tight contact on the spindle 19. The contact pressure of the V-sleeves 46 is generated by the spring means referred to above, which comprise a compression spring 47 and provide a preload for the entire V-sleeve packing in a way to be explained in greater detail below.

As FIG. 5 shows particularly clearly, the seal assembly 39 comprises a wiper 70 assigned to the base region and mounted there. The wiper 70 is likewise made of a plastic material, which may, however, be more rigid than that of the V-sleeves. The wiper 70 has a hollow-cylindrical base section 71, from the end faces of which an annular bearing ridge 73, on which the V-sleeves 46 placed above are mounted in the manner of riders, projects upwards. The base section 71 is adjoined in the axial direction by a lip section 72, which has on its outer circumference a cone surface 48 acting together with a cone surface 49 formed on the inside of the base region 45.

A further functional section of the cartridge housing 41 is a cover section 50 having a through-opening 51 for the spindle. The cover section is provided with a mounting interface 52 to be explained in greater detail below. The cover section 50 is cylindrical and has an annular groove 53, which is concentric with the through-opening 51 and into which an end section of the encasing region 43 of the locating section 42 dips to be joined there to the cover section 50. The locating section 42, i.e. the encasing region 43, it expediently welded to the cover section 50. The annular end face of the cover section 50, which is formed between the annular groove 53 and the through-opening 51, forms a support surface 54 for the compression spring 47. The opposite end of the compression spring 47 is supported on a backing ring 55, which is movably mounted within the encasing region 43 and which may be designed as a washer, for example. The backing ring 55 is pressed onto the V-sleeve packing, so that this and the V-sleeves 46 are preloaded towards the base region 45. The contact pressure of the compression spring 47 induces a radial spreading of the V-sleeves 46 and an axial displacement of the V-sleeve packing. As the through-hole 44 in the base region 45 is larger than the outer diameter of the spindle 19, a part 74 of the lip section 72 of the wiper 70 can pass through the through-hole 44, so that it terminates a little outside the locating section as shown in FIG. 5. The protruding annular part 74 of the lip section 72 is therefore capable of wiping or scraping off any dirt, process medium or the like accumulated on the spindle 19.

In the region of the through-opening 51, a bearing bush 60 is further secured in, for example pressed into, the cover section 50; this used for the bearing-mounting and the radial location of the axially movable spindle 19.

In addition to the seal assembly 39, the sealing device 38 further comprises a sealing unit 56, which is formed separately from the seal assembly 39. The sealing unit 56 comprises at least one annular sealing element 57, which is secured in an annular bearing chamber 58 formed for this purpose in the cover section 50. The sealing element 57 consists of an elastomer material. In the illustrated embodiment, the sealing element 57 has two axially spaced sealing lips 59a, 59b, which bear against the outer circumference of the spindle 19 while providing a fluid-tight seal. In addition to the sealing function, the sealing lips 59a, 59b have a further function, each of them serving as a wiper, preventing the ingress of dirt from the environment into the process medium via the control medium.

The seal cartridge 40 therefore provides a dual sealing action, i.e. a seal against the process medium and a seal against the control medium or the environment. The seal cartridge 40 further provides a dual wiper.

Figure 4:
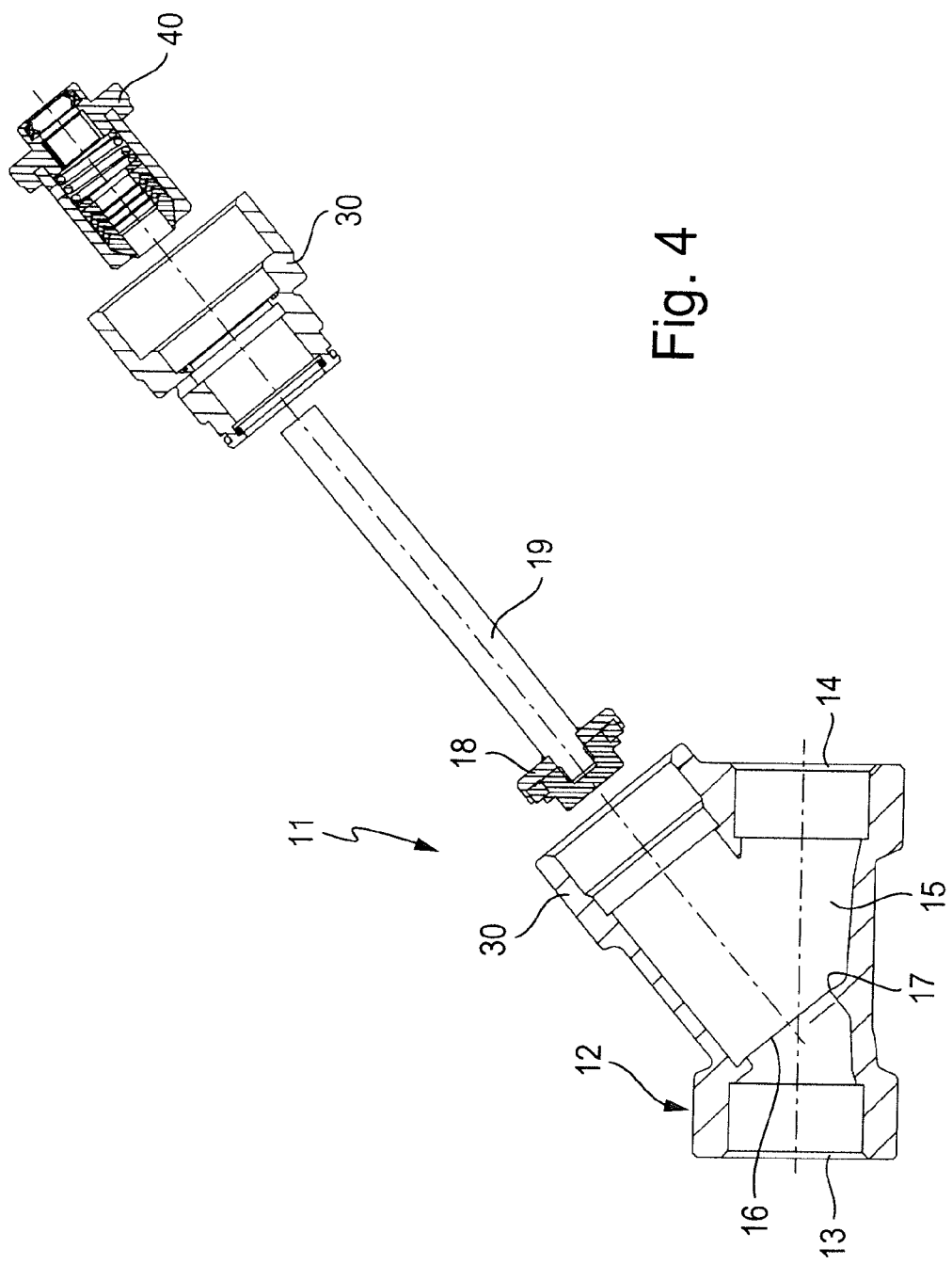
FIG. 4 is an exploded view in longitudinal section of the components of the valve according to FIG. 3.

In the assembly of the valve 11, which can be seen in FIG. 4, various modules are assembled quickly and easily. First, the spindle 19, which can be separated from the drive unit, is installed into the fluid ducting part 29 of the valve housing 12. The interface part 30 can then be screwed onto the fluid ducting part 29. Finally, the seal cartridge 40 can be screwed into the interface part 30. Alternatively, the seal cartridge 40 can be screwed into the interface part 30 before the interface part 30 is secured to the fluid ducting part 29. Lastly, the drive unit can be coupled by bolting a component of the drive unit provided for this purpose to the interface 28. The mounting of the drive unit on the interface 28 is independent of the seal cartridge 40. The seal cartridge is therefore not required for coupling the drive unit. This makes the dismantling of the valve 11, for example for replacing the seal cartridge 40, a very simple and quick operation as well, by uncoupling the drive from the interface 28 and unscrewing the seal cartridge 40 from the interface part 30.

The invention claimed is:

1. A valve comprising a valve housing through which a process medium can flow and in which a valve seat is located, which surrounds a through-flow opening and to which a valve member mounted on a spindle is assigned in such a way that the valve member is moved by means of an actuating stroke of the spindle between a blocking position in which the valve member bears against the valve seat in a process medium-tight manner and an open position in which the valve member is raised off the valve seat, and wherein an interface for coupling a drive unit generating the actuating stroke of the spindle is provided on the valve housing, and wherein a sealing device through which the spindle passes is accommodated in the valve housing, the sealing device comprising a spring and a seal assembly including sealing means bearing against the spindle while forming a seal and wherein the sealing device is accommodated in a seal cartridge which is separate from the valve housing and configured as an operational pre-assembly and which comprises a cartridge housing, which is secured to the valve housing, and in which the seal assembly and the spring are accommodated in such a way that the seal assembly is resiliently preloaded against the cartridge housing by the spring, and wherein the cartridge housing has a locating section comprising an encasing region and a base region, the encasing region encasing the seal assembly and the spring, and the base region provided with a central through-hole, and wherein the base region has an inner cone surface complementing a mating outer cone surface formed on the seal assembly, wherein the diameter of the through-hole is greater than the outer diameter of an end region of the seal assembly to such an extent that the seal assembly, owing to the mutually complementary cone surfaces and the preload generated by the spring, projects through the through-hole, terminating outside the encasing region with its free end.

2. A valve according to claim 1, wherein the seal cartridge has a mounting interface for self-retaining mounting on the valve housing, the mounting interface being formed on the cartridge housing.

3. A valve according to claim 2, wherein the mounting interface has a male thread formed on the outer surface of the cartridge housing.

4. A valve according to claim 3, wherein the cartridge housing has a cover section, which is connected to the locating section and has a through-opening for the spindle, and on which the mounting interface is formed, the cover section being cylindrical and the male thread for tightening into the valve housing being formed on a lateral surface of the cartridge housing.

5. A valve according to claim 4, wherein the cover section has a support surface, which faces the locating section and on which the spring is supported.

6. A valve according to claim 4, wherein the cover section and the locating section are welded to one another.

7. A valve according to claim 1, wherein the sealing device comprises a sealing unit, which is formed separately from the seal assembly and bears against the spindle while forming a seal, and which is positioned at an axial distance from the seal assembly, the sealing unit comprising at least one annular sealing element with at least one sealing lip bearing against the spindle to form a seal.

8. A valve according to claim 7, wherein the annular sealing element comprises at least two axially spaced sealing lips.

9. A valve according to claim 7, wherein the sealing unit is located in a cover section of the cartridge housing.

10. A valve according to claim 1, wherein the valve housing is constructed in several parts, with a fluid ducting part including the valve seat and a separately formed hollow-cylindrical interface part with the interface for coupling the drive unit.

11. A valve according to claim 10, wherein the interface part is releasably secured to the fluid ducting part.

12. A valve according to claim 11, wherein the releasable connection between the interface part and the fluid ducting part is implemented by way of a screw connection which comprises a male thread formed on the interface part and a female thread formed on a coupling section of the fluid ducting part.

13. A valve according to claim 10, wherein the seal cartridge is accommodated in the interface part and releasably secured there.

* * * * *